Figure 1:
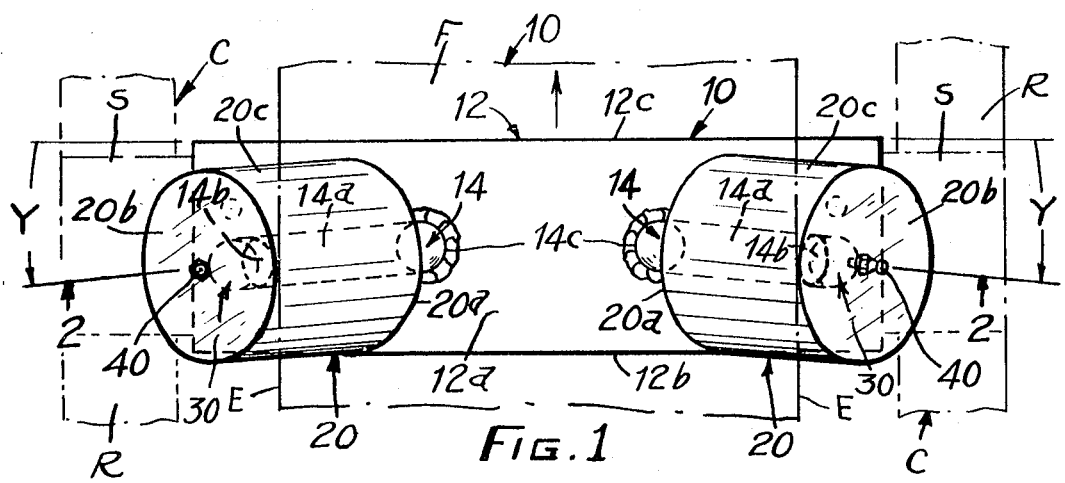

United States Patent

Speck

[15] 3,648,824
[45] Mar. 14, 1972

[54] IDLER ROLLER DEVICE FOR TROUGHED CONVEYOR BELTS

[72] Inventor: Charles D. Speck, 205 Geneva St., St. Catharines, Ontario, Canada

[22] Filed: Sept. 4, 1970

[21] Appl. No.: 69,586

[52] U.S. Cl. ..........................................................198/192
[51] Int. Cl. ......................................................B65g 15/08
[58] Field of Search ..........................198/192, 202, 201, 191

[56] References Cited

UNITED STATES PATENTS

| 699,477 | 5/1902 | Bee | 198/192 |
| 1,963,099 | 6/1934 | Robins | 198/192 |

*Primary Examiner*—Richard E. Aegerter
*Attorney*—Sim & McBurney

[57] ABSTRACT

A pair of urethane idler rollers having center bearing holes with but one entrance journaled on, and enclosing the upper metal bearing portions of upwardly inclined shafts, each supported at one end. The shafts and rollers thereon extend upwardly and outwardly in opposite directions to engage the inclined sides of a troughed conveyor belt and skewed backwardly at a slight angle from a normal to its direction of movement. Movement of the troughed belt rotates and imposes a downward thrust on the skewed rollers to keep them from falling off, prevent the bearing surfaces from becoming exposed, and allow the belt to flex and shift relative to rollers without axially displacing the rollers.

10 Claims, 2 Drawing Figures

INVENTOR.
CHARLES D. SPECK

IDLER ROLLER DEVICE FOR TROUGHED CONVEYOR BELTS

The invention relates to conveyors and particularly to an idler roller device for supporting troughed conveyor belts.

Existing troughed belt conveyor idlers on the market are relatively expensive and generally consist of three rollers precision antifriction bearings, and seals which are difficult and expensive to maintain. In an abrasive environment they wear out quickly causing long shut downs, and require skilled personnel to service, repair or replace them.

The applicant has overcome the above problems by providing durable urethane rollers rotatably journaled on the upper free end portions of a pair of inclined metal shafts. Urethane surfaces bearing against the metal shafts produce a low friction and long lasting device. In addition the rollers can be, without removing the conveyor belt, quickly slipped on and off the inclined shaft when maintenance or replacement is required. The bearing surfaces are protected by the rollers which are arranged to prevent the belt from displacing them axially, and the lubricant injected between the bearing surfaces of the rollers and the shafts. Friction, heat, and wear are greatly reduced by axial thrust bearing means having substantially point contact with the shaft and the roller.

The applicant is aware of commercially available idler roller devices having three quickly replaceable non-lubricating plastic conveyor rolls with short shouldered bearing shafts at opposite ends of each roller rotatably mounted in half bearing slots in a plastic bracket or frame. However, the bearing surfaces of the shafts are only partially protected from an abrasive or other destructive environments by the belt passing over them. The bearing shaft adjacent each side edge of the belt is fully exposed to the destructive environment. The device usually consists of a horizontal center roller and inclined rollers at opposite sides of the center roller. Unlike the applicant's two roller device the belt cannot move freely axially along the rollers as a result of the belt flexing and the uneven distribution of the material load placed on the troughed conveyor belt.

An elongated generally flat support bracket is adapted to be centered and fixed to the primary support or frame of a conveyor so that it extends transversely of the length and substantially horizontally under the width of a troughed conveyor belt in a direction generally normal to the direction of conveyance. A pair of roller support shafts are fixedly supported at one end only to the bracket and project at a predetermined angle upwardly, and outwardly in generally opposite directions from a central portion of the bracket and skewed backwardly at a slight angle from the direction of movement of the conveyor belt. Each backwardly inclined shaft is adapted to extend upwardly adjacent each upwardly inclined side portion on opposite sides of troughed conveyor belt and has a roller rotatably mounted on, over, protecting, and enclosing an upper end bearing portion of the shaft. The belt rotates the rollers about the backwardly inclined axes, exerts a downward thrust, and prevents their being displaced axially. Each roller has a central hole with a single entrance thereto and into which each shaft extends upwardly until its upper end is adjacent to or contacts an upper top end wall of the roller. An axial thrust bearing is provided either by direct engagement between the end shaft and the top wall of each roller or preferably by a ball bearing interposed between them. The bearing surfaces between the rollers and the shafts are preferably a urethane material engaging metal which extends the life of the bearing. Lubricant can be introduced into the central hole before inserting the roller over the shaft, or by providing a small hole or a grease fitting in the upper top wall of the roller.

Therefore it is the primary object of the invention to provide an inexpensive, easily maintained, durable, self protecting idler roller device for supporting a troughed conveyor belt.

Figure 2:
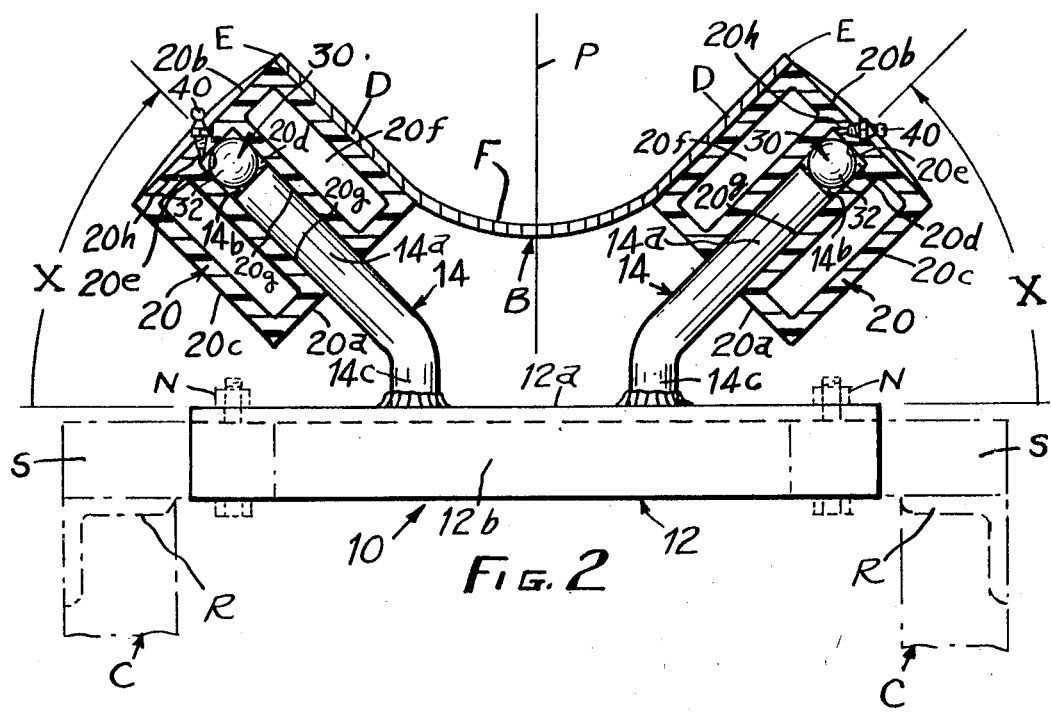

FIG. 1 is a plan view of one idler roller device of the invention mounted, under a troughed conveyor belt, on a primary conveyor support shown in phantom lines; and FIG. 2 is a partial cross sectional view in elevation of the idler roller device taken approximately on line 2—2 of FIG. 1.

Referring to the drawings, a conveyor idler roller device or mechanism 10 of the instant invention is shown, in full lines, centrally mounted on and extending between the opposite uprights or siderails R of a primary conveyor support or frame C shown in phantom lines. In reality, a plurality of the idler roller devices 10 are fixed at intervals along the length of the conveyor support C and extend generally transversely thereto between an upper troughed feed run F and a lower return run not shown of a flexible endless conveyor belt B. The invention is concerned with providing a simple, long lasting, economical, easily serviced, and replaceable idler roller device for supporting and engaging the generally oppositely upwardly inclined side portions D, located on opposite sides of a central vertical plane P passing generally through the troughed belt midway between the opposite edges of the belt E and the siderails R of the conveyor C.

The idler roller device 10 comprises support means, such as an elongated support bracket or base plate 12 made preferably of conventional high strength structural stock such as I, and T beams, U channels, L angle etc., having a high resistance to bending. As shown the support bracket 12 extends longitudinally between the siderails R and rigidly fixed, by bolts and nuts N at its opposite end portions, to inwardly projecting support pads S, suitably fixed, as by welding, to the siderails R. Alternatively, the bracket 12 could be extended over and bolted or welded to the rails R whereby it would become a cross support member of the primary conveyor support. The bracket 12 has a top wall 12a extending horizontally between the pads S and holes therein by which it is bolted to the pads S and a vertical wall 12b extending downwardly therefrom. Opposite ends of the bracket 12 are open and into which the pads S project.

Fixed to a central portion of the top wall 12a are a pair of inclined roller supports or bearing shafts 14 extending in generally opposite directions from the central vertical plane P towards the siderails R, the edges e of the conveyor belt, and the opposite ends of the bracket 12. Each support shaft 14 has a straight cylindrical bearing portion or surface 14a extending between an upper end or thrust bearing end surface 14b and a lower end or portion 14c suitably fixed, as by welding to the central portion of the top wall 12a. The inclined shafts 14 project upwardly and outwardly at an angle X from the top wall 12a and backwardly, from the direction of movement of the troughed conveyor belt B, at a slight angle Y from a forward plane or forward side 12c, of the bracket 12, normal to the direction of movement of the troughed belt B indicated by the arrow.

The angle X of inclination between the axis of each shaft 14 and the top wall may vary in range between 5° and 70° but are preferably equally inclined at substantially 45° as shown. Angles Y between the inclined axis of each shaft and a forward plane or the side 12c normal to the movement of the belt B may vary between 1°–10° but situated preferably equally inclined at substantially an angle of 5°.

The shafts 14 can be made in any well known manner and are preferably constructed from round smooth cold rolled metal shafting of standard diameters which requires substantially no machining to prepare the bearing surface. They can be straight instead of being bent at the lower end portion 14c as shown. The lower ends of the shafts could be cut off flat at angle and welded to the top wall 12a whereby the shafts form a generally V-shape configuration. In some instances such as, when a narrower belt is to be supported, the lower ends of the shafts could be welded to a center post or shaft, to form a Y shaped structure, which post is then welded to the top wall 12a or other suitable support means. Certainly, the shafts can be extended and adapted to be fastened directly to the primary conveyor support or fastened to the bracket 12 in any suitable, conventional well known manner just as long as the desired angular relationship is achieved and maintained.

A pair of idler rollers 20, are rotatably mounted on, over, and about the upper bearing portions 14a of the shafts 14. Each roller 20 is of generally cylindrical shape having a bottom surface or wall 20a, and end wall or top surface 20b, an outer annular wall or peripheral surface 20c extending between them, and a center bearing hole 20d with but one entrance, at the bottom surface 20a at one end of the roller, for the shaft 14 to enter into. The center bearing hole extends along the central axis of the roller from the bottom surface 20a to an inner bearing surface or end wall 20e opposite the top surface 20b. The bearing hole is made just slightly larger in diameter than the diameter of the bearing portion 14a, so as to provide a good bearing fit between the roller and the portion 14a. As shown the roller 20, in this instance, has an annular chamber 20f situated between the outer wall 20c and an inner annular wall or bearing surface 20g around the center bearing hole 20d. When the rollers 20 are small, excess weight and costs are not as important, the rollers 20 may be made solid instead of hollow as shown. A lighter roller reduces the axial end thrust and wear between the roller and its support shaft 14.

Various metals and plastic materials may be used for making the rollers and which provide a good wearing, long lasting, and durable bearing surface in combination with the metal bearing portions 14a of the shafts 14. In addition to bearing quality, the material of which the roller is made must have good resistance to at least the environment in which it is being used. Preferably, the roller material used should be resistant to as many of the destructive substances which are known to exist in areas where conveyors of this type are used and thereby the roller device could be used universally in any of those environments. It has been found that urethane plastic material is highly resistant to many corrosive and abrasive environments and provides a long lasting, durable, and low friction bearing when journaled for engagement with a metal shaft. Therefore, the rollers 20 could be made entirely of urethane or of other materials with a urethane coating or liner of predetermined thickness on its exposed exterior surfaces and on the inner bearing surfaces 20g and 20e around the center hole 20d. Alternatively, the bearing portions 14a of shafts 14 could have a urethane coating or liner and engage either a metal roller or a urethane roller with a metal coating or liner on the inner bearing surfaces 20g and 20e. Preferably, the bearing between the bearing portion 14a and the inner bearing surface 20g is any suitable construction and combination of materials which includes a smooth metal surface in engagement with a smooth urethane surface.

Thrust bearing means 30 are provided for simultaneously reducing the area of frictional contact, wear, heat, and to resist the axial thrust between the shafts 14 and the rollers 20. Each of the thrust bearing means 30 comprises at least a member having a convex surface as is preferably a metal spherical ball bearing 32 situated, in the center hole 20d, between the upper end or thrust bearing surface 14b of shaft 14 and the inner wall or thrust bearing surface 20e of the roller 20. The ball bearing 32 provides substantially point contact with each of the surfaces 14b and 20e, is smaller in diameter than the center hole, and is free to rotate within the center bearing hole, hence changing its points of contact and distributing the wear evenly over its peripheral surface. Axial thrust bearing means of other suitable designs may be used. For example either or both the upper end surface 14b and the inner thrust bearing surface 20e could be of convex shape or have the shape of a partial sphere. Thus you could either have point contact between a pair of convex or partly spherical surfaces, or between a convex or partly spherical surface and a substantially flat surface. Also, either one or both of the thrust bearing surfaces 14a and 20e could be a concave surface of larger radius than the radius of the contacting convex or partly spherical surface. In some instances where the diameter and hence the cross sectional area of the shaft 14 and the roller are small, the surfaces 14a and 20e which are shown as being generally flat could be allowed to engage one another without generating too much friction, heat, and wear. However, in all cases, it is advisable to provide lubricating grease or oil between the bearing surfaces. The bearing surfaces can be lubricated by either coating them and packing the upper end of center hole with a sufficient amount of grease before inserting the roller 20 onto the shafts 14. Another method is to provide a small oil hole 20h preferably offset or slanted as shown from the central axis of rotation of the roller, through the top wall 20b and into the center bearing hole 20d. As shown a grease gun fitting 40 is inserted into slanted hole and fixed at an angle to the end wall 20b of the roller in any suitable conventional manner, whereby lubricating oil or grease can be pumped under pressure into the center hole 20d and in between the bearing surfaces. Also, the center of gravity of the grease filling is substantially at the central axis of rotation to help maintain the roller in balance.

A plurality of the roller devices 10 are suitably mounted at spaced intervals along the length of the conveyor C with the rollers 20 under and in supporting engagement with the undersides of the upwardly inclined side portions D adjacent opposite sides E of the longitudinally extending troughed feed run F of the conveyor belt B. The concaved center portion of the troughed belt B between the inclined sides and the rollers, is unsupported and hence the belt B can move downwardly various slight amounts depending upon the weight of the load placed thereon. However, the transverse distance between the rollers is such, as to allow approximately one-third or less of the width of the belt to extend between them and to accommodate a very small portion of the total possible load. Therefore a small load on the troughed belt between the rollers would normally be of insufficient weight to move the belt downward or out of engagement with the rollers. Upon loading the belt B the center of the trough fills quickly and then the added load extending up the inclined sides counteracts the weight of the load in the center of the trough. However, the belt B would most always be loaded unevenly which causes the side portions D of the belt to shift up and down relative to the rollers 20.

As the troughed feed run F of the conveyor belt B moves between the loading and the dumping stations, it engages the skewed rollers 20 at the slight relative angle Y backwardly away from the direction of movement of the belt. Belt B moving in the direction indicated by the arrow, simultaneously rotates and exerts a downward thrust to rollers 20. The downward thrust is of sufficient magnitude to resist the upward opposing force resulting from any upward movement of the side portions D of the belt B along the axial length of the rollers. Therefore in normal operation of the conveyor the rotating rollers are prevented from falling off the shafts 14, constantly maintained substantially in the extreme downward position, and prevents the bearing surfaces of portions 14a from becoming exposed to the environment which may be abrasive or corrosive in nature. In addition the bearing surfaces 14a are further protected by the lubricant which under gravity moves downwardly very slowly and oozes out the bottom end of the rollers 20. The rate at which the lubricant moves downwardly depends, of course, on its viscosity and cohesiveness. High quality conventional lubricants of high viscosity, and good cohesive properties which are unaffected by a normal rise in temperature, such as fibrous wheel bearing grease, are preferred. Also, the exposed lubricant which may become contaminated at the bottom of rollers 20 cannot be carried upwardly to the bearings surfaces.

Maintaining the durable idler roller device 10 in good running condition is simple and economical. The rollers 20 can be inspected, lubricated, and serviced easily without removing the conveyor belt B or the idler roller device 10 from the primary conveyor support C. The conveyor belt B is simply lifted out of engagement with the roller which can then be slipped on or off of the support shafts 14 for servicing, or replacement thereof.

It is to be understood that many modifications may be made of the embodiments of the invention disclosed hereinabove without departing from the spirit of the invention and which are within the scope of the appended claims.

What I claim as my invention is:

1. An idler roller device adapted to be supported by a primary conveyor support and to supportingly engage opposite upwardly inclined side portions of a troughed conveyor belt, comprising:

means, fixed to the primary conveyor support, including a pair of upwardly, outwardly and backwardly inclined support shafts each supported at one end from which the support shafts extend in substantially opposite directions to opposite upper ends of the support shafts for supporting a pair of rollers under and in supporting engagement with the said opposite upwardly inclined side portions of the belt and for rotation by the belt about axes and bearing surfaces of the support shafts inclined both upwardly adjacent the inclined side portions and backwardly from a direction of movement of the troughed conveyor belt and a vertical plane normal to the direction of movement; and a pair of idler rollers rotatably mounted on the upwardly and backwardly inclined support shafts, each roller having a center bearing hole into which one of the inclined support shafts extends, a single entrance into the center bearing hole, at one end of the roller, by which the roller is inserted over the upper end of one of the support shafts, and an end wall at an opposite end of the roller enclosing the upper end of one of the support shafts; whereby the rollers rotate freely about upwardly, outwardly and backwardly inclined axes, the belt rotates and contacts the rollers at an angle and thereby exerts a downward thrust to maintain the rollers on the support shaft, prevents the rollers from being displaced axially during the movement of the troughed conveyor belt and exposing the bearing surfaces of the shafts, and the rollers can be easily slipped on and off the bearing shafts for servicing.

2. An idler roller device according to claim 1 wherein the bearing shafts and the rollers have smooth bearing surfaces engaging one another, and one of the smooth bearing surfaces is a metal surface engaging a urethane surface.

3. An idler roller device according to claim 2 further comprising:

axial thrust bearing means, having at least one convex surface, between the upper ends of the shafts and the end walls within the center bearing holes of rollers, for providing a substantially reduced area of contact for reducing friction, heat, and wear between the shafts and the downwardly thrusted rollers.

4. An idler roller device according to claim 3 wherein the axial thrust bearing means comprises:

spherical ball bearings in the center bearing holes between the end walls and the upper ends of the bearing shafts.

5. An idler roller device according to claim 4 wherein the rollers are made of urethane material and the bearing shafts are made of metal.

6. An idler roller device according to claim 5 further comprising:

lubricating means for introducing lubricant into the center bearing holes, to, and in between the bearing surfaces of the shafts and the rollers.

7. An idler roller device according to claim 6 wherein the lubricating means comprises:

a grease fitting fixed to the end wall of each of the rollers and a small hole extending from the grease fitting through the end wall into the center bearing hole with an exit end of the small hole offset from the central axis of the roller.

8. An idler roller device according to claim 7 wherein the means for supporting a pair of rollers further comprises:

a support bracket adapted to be fixed to the primary conveyor support in substantially a horizontal position under the troughed conveyor belt and to which the one end of each of the bearing shafts is fixed.

9. An idler roller according to claim 8 wherein the inclined bearings shafts are backwardly inclined from the vertical plane at an angle of 1° to 10°.

10. An idler roller device according to claim 9 wherein the bearing shafts and the rollers are inclined upwardly at an angle of 5° to 70° from a horizontal plane.

* * * * *